United States Patent [19]

Winchip

[11] 4,408,509

[45] Oct. 11, 1983

[54] CANTILEVERED SLIDING TABLE

[75] Inventor: Galen J. Winchip, Ames, Iowa

[73] Assignee: Iowa State University Research Foundation, Inc., Ames, Iowa

[21] Appl. No.: 325,390

[22] Filed: Nov. 27, 1981

[51] Int. Cl.³ .............................................. B27B 25/10
[52] U.S. Cl. ................................. 83/435.1; 83/477.2; 83/437; 144/286 A
[58] Field of Search .................... 83/477.2, 435.1, 437; 144/286, 285

[56] References Cited

U.S. PATENT DOCUMENTS

| 3,240,244 | 3/1966 | Biro | 83/435.1 X |
| 3,429,347 | 2/1969 | Klein | 83/435.1 |
| 4,248,115 | 2/1981 | Brodbeck et al. | 83/435.1 |

Primary Examiner—Donald R. Schran
Attorney, Agent, or Firm—Zarley, McKee, Thomte, Voorhees & Sease

[57] ABSTRACT

A cantilevered sliding table is mounted on a main table having a horizontal top surface supported on a main frame. An elongated guide rail is supported adjacent one edge of the top surface and a parallel thrust rail is mounted on the main frame below the guide rail. The sliding table has an open bottomed guide way formed in the underside thereof for placement onto the guide rail. A depending pedestal on the underside of the sliding table carries a thrust surface adapted for bearing engagement against the thrust rail when the guide way is seated on the guide rail. The sliding table and pedestal are thus slidably mounted in cantilevered fashion on the main table.

12 Claims, 5 Drawing Figures

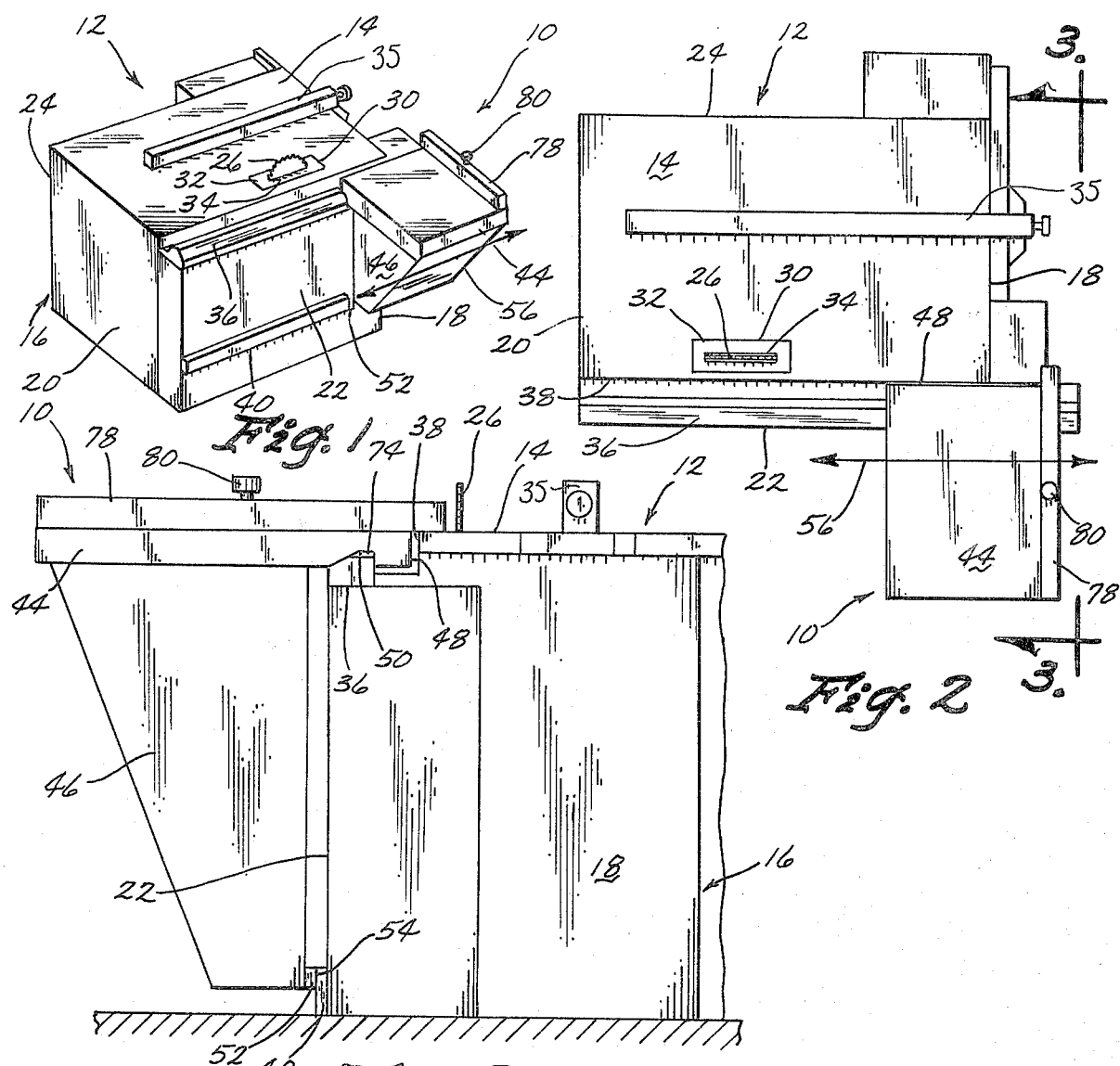
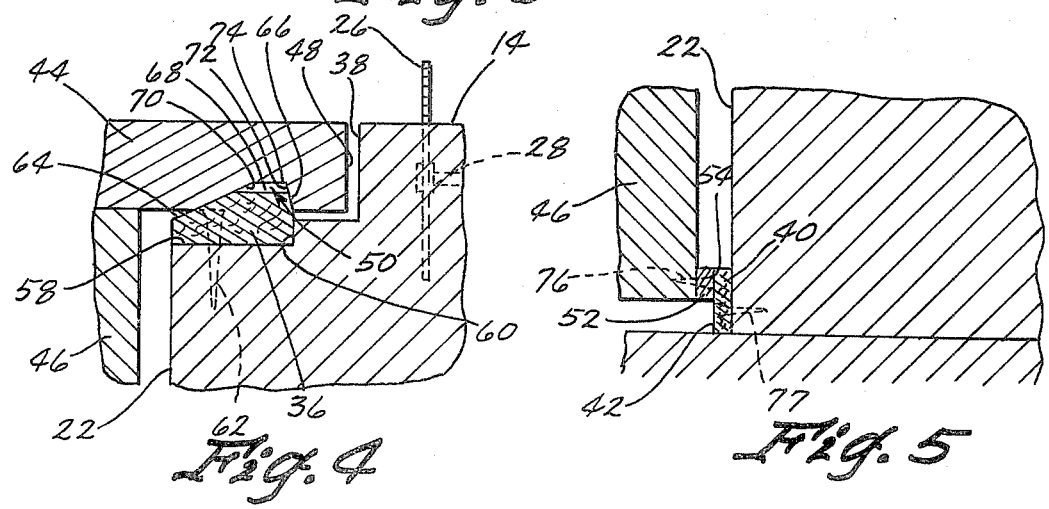

CANTILEVERED SLIDING TABLE

BACKGROUND OF THE INVENTION

The present invention is directed generally to a sliding table supported in cantilevered fashion and more particularly to a cantilevered sliding table mounted on a table saw to facilitate the cross-cutting of long, wide or heavy stock.

Many table saws produced early in this century employed moving tables for cross-cutting. Recently, moving tables have been offered as standard or optional equipment on certain domestic and imported table saws. The moving tables of all known table saws, however, both past and existing, are supported by small wheels which roll on a guiding rail. The guiding wheels are generally arranged along one side of a sliding table with thrust wheels provided on the opposite side for rolling movement along a thrust rail.

A primary problem with the past and existing moving tables is that sawdust which collects on the rails is compacted between the rails and wheels due to the high pressures caused by the point load of the wheels on the rails. Sawdust compaction results in a loss of precision and impairs the smooth operation of the moving table. Furthermore, the known sliding tables were not easily removed from the table saw and the permanent rails remained as an obstruction even after removal of the moving table itself. These and other problems of existing moving tables are believed to be resolved by the cantilevered sliding table of the present invention.

Accordingly, a primary object of the invention is to provide an improved moving table for a table saw.

Another object is to provide a sliding table which is supported in cantilevered fashion for sliding movement along one edge of a main table.

Another object is to provide a sliding table having an open bottomed guide way for direct placement onto the guide rail for sliding movement thereon.

Another object is to provide on a table saw, a moving table which is not affected by sawdust compaction.

Another object is to provide a moving table having a support system which is self-centering and capable of directing the table along a straight line.

Another object is to provide a moving table which is easily removed from the main table on which it is slidably supported.

Finally, an object is to provide a sliding table which is economical to manufacture, simple and durable in construction, and efficient in operation.

SUMMARY OF THE INVENTION

The cantilevered sliding table of the present invention is mounted on an elongated main table having a horizontal top surface supported on a main frame. An elongated guide rail is supported adjacent one end of the top surface and extended longitudinally of and parallel to one edge of the top surface. An elongated thrust rail is mounted on the main frame below the guide rail. A sliding table has an elongated open bottomed guide way in the underside thereof for placement onto the guide rail for sliding movement therealong. A depending pedestal on the sliding table has an elongated thrust surface thereon which engages the lower thrust rail on the main table thereby to maintain the horizontal relation of the sliding table. The sliding table and pedestal and thereby slidably mounted in cantilevered fashion on the main table.

The sliding table of the present invention is a true "sliding" table as opposed to the rolling tables of the prior art. The sliding table of the present invention has no wheels and is hence not affected by sawdust compaction. The converging bearing surfaces of the upper guide way are self-centering and guide the table along a straight line. The lower thrust rail and thrust surface keep the table level and are also unaffected by sawdust compaction due to the upright disposition of their contact surfaces.

The "cantilevered" mounting of the sliding table on the main table is conducive to easy removal of the sliding table. Furthermore, since the guide rail and thrust rail are disposed closely adjacent the main frame of the table saw, removal of the sliding table leaves the saw more compact, and easier to use for ripping of small stock.

Due to the "sliding" action of the sliding table, rather than a "rolling" action, the table moves with a consistant, predictable amount of friction.

BRIEF DESCRIPTION OF THE DRAWINGS

FIG. 1 is a perspective view of the cantilevered sliding table of the invention in assembly relation with a table saw;

FIG. 2 is an enlarged top plan view of the saw and sliding table of FIG. 1;

FIG. 3 is a further enlarged end view taken along line 3—3 in FIG. 2;

FIG. 4 is an enlarged detail sectional view showing the open bottomed guide way placed onto the guide rail; and FIG. 5 is an enlarged detail sectional view showing the engagement of the thrust way against the thrust rail.

DESCRIPTION OF THE PREFERRED EMBODIMENT

The cantilevered sliding table 10 of the present invention is shown in FIG. 1 in assembly relation with a table saw indicated generally at 12.

The table saw 12 includes a flat horizontal working surface 14 supported on a base frame 16 which, in the preferred embodiment shown, includes forward and and rearward upright end walls extended between and connected to opposite side walls 22 and 24. Whereas the working surface 14 and base frame 16 in the preferred embodiment are constructed substantially of wood, it will be apparent that the cantilevered sliding table 10 of the present invention is readily adaptable for use on conventional metal table saws with certain modifications as described hereinbelow.

A saw blade 26 is supported on an arbor shaft 28 (FIG. 4) situated below working surface 14 with the blade extended upwardly through an access opening 30. A cover plate 32 substantially closes opening 30 except for an elongated blade receiving slot 34. A rip fence 35 is transversely slidably supported on the working surface 14 by conventional means so as to remain parallel with the blade 26 at all transversely adjusted positions thereof. The table saw 12 as thus far described is conventional.

To accommodate the cantilevered sliding table 10 of the present invention, the table saw 12 is provided with an elongated guide rail 36 supported in horizontal relation at a position below and outwardly of longitudinal edge 38 of working surface 14. Substantially below guide rail 36, base frame 16 is provided with an elongated horizontal thrust rail 40 having an upright outer engagement surface 42.

The cantilevered sliding table 10 includes a flat slide table 44 mounted on a depending pedestal 46. The pedestal is recessed away from the inner edge 48 of slide table 44 to expose a longitudinally extended downwardly opening guide way 50 in the underside of table 44. It is the guide way 50 which is placed onto guide rail 36 for sliding movement therealong.

To support the outward side of slide table 44, pedestal 46 is provided with a longitudinally extended horizontal thrust way 52 having an upright inner surface 54 which frictionally engages thrust rail 40 when the guide way 50 is placed onto guide rail 36. Accordingly, the sliding table unit 10 is supported on cantilevered fashion on the table saw 12 with freedom of longitudinal back and forth sliding movement relative thereto as indicated by arrow 56 in FIG. 2.

Guide rail 36 is shown in FIG. 4 as a removable rail member adapted to be seated onto a vertically recessed support surface 58 in abutment against an upright shoulder 60 which fixes the transverse position of the guide rail relative to edge 38 of working surface 14. The guide rail 36 may be secured in position by screws 62 or any other suitable fastening means.

Guide way 50 is provided with a pair of upwardly converging inclined guiding surfaces 64 and 66. One of the surfaces, which in the embodiment shown is the outer surface 64, is nearly horizontal, being inclined upwardly and rearwardly at an angle of between 5° and 30° from horizontal, preferably between 10° and 20°. The opposite guiding surface 66 is nearly vertical, being inclined upwardly and outwardly at an angle between 5° and 30° from vertical, preferably between 10° and 15°. Note that the upper edges of guiding surface 64 and 66 do not contact one another but rather are transversely spaced apart by flat top surface 68.

The downwardly opening guide way 50 likewise is provided with a pair of bearing surfaces 70 and 72 having inclinations corresponding to guiding surface 64 and 66 for bearing engagement thereon as indicated in FIG. 4. The upper edges of bearing surfaces 70 and 72 converge somewhat closer together than the upper edges of guiding surfaces 64 and 66 thereby to define a clearance space 74 between the guide way 50 and guide rail 36. Note that the bearing surfaces 70 and 72 are arranged relative to one another and to the slide table 44 so that when the guide way is set onto the guide rail 36, the top surface of slide table 44 is coplanar with working surface 14 of the table saw.

In FIG. 5, the thrust way 52 is shown as an elongated board secured to the inside surface of pedestal 46 by wood screws 76. In similar fashion, the thrust rail 42 may be secured to a lower portion of the table saw base frame 16 by countersunk wood screws 77.

In operation, the cantilevered sliding table 10 may be quickly and easily installed onto the table saw 12 by simply placing the downwardly opening guide way 50 onto guide rail 36 and allowing the thrust way 52 to pivot downwardly into bearing engagement against the thrust rail 40. To facilitate the positioning of a board on sliding table 10, a stationary fence 78 may be provided along one edge with a handle 80 for facilitating back and forth movement of the table 10.

The clearance space 74 between the guide rail 36 and guide way 50 enables the guide way to be freely lowered in selfcentering fashion onto the guide rail without obstruction.

Whereas a preferred embodiment of the invention has been shown and described herein, it will be apparent that many modifications, substitutions and alterations may be made which come within the intended broad scope of the appended claims. For example, whereas the guide way 50 has been shown as formed within the underside of the slide table 44 itself, the actual table surface may include cross bars on the underside thereof with the guide way formed in the protruding portions of the cross bars. Furthermore, whereas the invention is disclosed in connection with a wood sliding table mounted on a wood table saw, it will be apparent that with suitable materials the invention is equally applicable for use on conventional metal table saws as well.

Thus there has been shown and described a cantilevered sliding table which accomplishes at least all of the stated objects.

I claim:

1. A cantilevered sliding table, comprising,
   an elongated main table including a generally horizontal top surface and a main frame for supporting said top surface,
   an elongated guide rail,
   means for supporting said guide rail adjacent one end of said top surface with said guide rail extended longitudinally of and parallel to said one edge,
   an elongated thrust rail mounted on said main frame and extended longitudinally thereof in parallel and vertically spaced relation below said guide rail,
   a sliding table,
   a pedestal connected to and depending from said sliding table,
   said sliding table having an elongated open bottomed guide way in the underside thereof for placement onto said guide rail for sliding movement thereon, and
   an elongated thrust surface on said pedestal at a position for sliding engagement against said thrust rail when said guide rail is received in said guide way whereby said sliding table and pedestal are slidably mounted in cantilevered fashion on said main table.

2. The cantilevered sliding table of claim 1 wherein said guideway and thrust surface and arranged relative to said sliding table such that the top surface of said sliding table is coplanar with the top surface of said main table upon placement of said guideway onto said guide rail.

3. The cantilevered sliding table of claim 1 wherein said guide rail includes first and second upwardly converging inclined guiding surface and said guide way being formed at least in part by coacting third and fourth surfaces having inclinations substantially the same as said first and second surfaces respectively.

4. The cantilevered sliding table of claim 3 wherein said first surface is nearly horizontal and said second surface is nearly vertical.

5. The cantilevered table of claim 4 wherein said first guiding surface is inclined upwardly at an inclination of between 10° and 20° from horizontal and said second surface is inclined upwardly at an inclination of between 75° and 80° from horizontal.

6. The cantilevered table of claim 1 wherein said guide rail and thrust surface are made of wood.

7. The cantilevered sliding table of claim 1 wherein a clearance space is formed between said guide rail and guide way upon placement of said guide way onto said guide rail.

8. The cantilevered sliding table of claim 3 wherein said first, second, third and fourth surfaces are flat.

9. The cantilevered sliding table of claim 8 wherein said guide rail has a top surface connected to and extended between said first and second surfaces.

10. The cantilevered sliding table of claim 1 wherein said main table comprises a table saw including a transversely extended arbor shaft for rotatably supporting a saw blade, said sliding table being slidable on said guide rail in a direction perpendicular to the axis of said arbor shaft.

11. The cantilevered sliding table of claim 10 wherein said sliding table includes an upstanding stationary fence along one edge thereof, said fence being directed perpendicular to said guide way.

12. The cantilevered sliding table of claim 1 wherein said guide rail is vertically positioned adjacent and below said top surface of the main table.

* * * * *